US010674711B2

(12) United States Patent
Hutton

(10) Patent No.: US 10,674,711 B2
(45) Date of Patent: Jun. 9, 2020

(54) EDIBLE SPINNING TOP FOR DOMESTICATED ANIMAL

(71) Applicant: Amanda E. Hutton, Lantana, FL (US)

(72) Inventor: Amanda E. Hutton, Lantana, FL (US)

( * ) Notice: Subject to any disclaimer, the term of this patent is extended or adjusted under 35 U.S.C. 154(b) by 7 days.

(21) Appl. No.: 16/179,987

(22) Filed: Nov. 4, 2018

(65) Prior Publication Data

US 2019/0069521 A1    Mar. 7, 2019

Related U.S. Application Data

(63) Continuation-in-part of application No. 14/543,889, filed on Nov. 17, 2014, now abandoned.

(60) Provisional application No. 61/904,954, filed on Nov. 15, 2013.

(51) Int. Cl.

| | | |
|---|---|---|
| *A01K 15/02* | (2006.01) | |
| *A23K 50/42* | (2016.01) | |
| *A23K 10/30* | (2016.01) | |
| *A63H 1/10* | (2006.01) | |
| *A23K 20/147* | (2016.01) | |
| *A23K 20/10* | (2016.01) | |
| *A23K 20/20* | (2016.01) | |
| *A23K 20/158* | (2016.01) | |

(52) U.S. Cl.
CPC .......... *A01K 15/026* (2013.01); *A01K 15/025* (2013.01); *A23K 10/30* (2016.05); *A23K 20/10* (2016.05); *A23K 20/147* (2016.05); *A23K 20/158* (2016.05); *A23K 20/30* (2016.05); *A23K 50/42* (2016.05); *A63H 1/10* (2013.01)

(58) Field of Classification Search
CPC .......... A01K 5/025; A01K 5/026; A63H 1/00
USPC ........ 119/702, 707, 709, 710, 711; 424/104, 424/140
See application file for complete search history.

(56) References Cited

U.S. PATENT DOCUMENTS

| | | | | |
|---|---|---|---|---|
| 685,311 A | * | 10/1901 | Ward ....................... | A63H 1/00 446/264 |
| 1,171,196 A | * | 2/1916 | Handell ................... | A63H 1/28 446/258 |
| 1,872,203 A | * | 8/1932 | Wily ........................ | A63H 1/00 446/262 |
| 2,008,851 A | * | 7/1935 | Canter ..................... | A63H 1/00 446/256 |
| D181,779 S | * | 12/1957 | Buralli ........................ | D21/460 |

(Continued)

FOREIGN PATENT DOCUMENTS

GB           190711915 A  * 10/1907

*Primary Examiner* — Ebony E Evans
(74) *Attorney, Agent, or Firm* — Kali Law Group, P.C.

(57) ABSTRACT

Edible spinning tops for domesticated animals are presented including: a spindle formed along a central axis; a body formed symmetrically and radially about the central axis and forming an annular cavity about the spindle; a protrusion positioned along the central axis and disposed along the body opposite the spindle; and retaining structures positioned separately along the spindle each forming a raised barrier and a retention valley therebetween, where the spindle protrudes above the body, and where the spindle, the body, and the protrusion include an edible, desiccated, and brittle composition. In some embodiments, an edible ring captured along the retention valley between the retaining structures about the spindle.

14 Claims, 18 Drawing Sheets

(56) References Cited

U.S. PATENT DOCUMENTS

| | | | | |
|---|---|---|---|---|
| 3,392,482 A | * | 7/1968 | Nathan | A63H 1/00 |
| | | | | 446/261 |
| D269,688 S | * | 7/1983 | Molenaar | D21/460 |
| D301,259 S | * | 5/1989 | Rubino | D21/460 |
| 4,943,063 A | * | 7/1990 | Moreau | A23G 3/50 |
| | | | | 273/157 R |
| 5,261,851 A | * | 11/1993 | Siebert, Jr. | A63H 1/00 |
| | | | | 446/236 |
| D349,512 S | * | 8/1994 | Law | 401/195 |
| 6,409,570 B1 | * | 6/2002 | Thate | A63H 1/04 |
| | | | | 446/236 |

\* cited by examiner

EDIBLE SPINNING TOP FOR DOMESTICATED ANIMAL

BACKGROUND

As dogs have been domesticated to actively live with humans and interact with them daily, humans have continually found ways to entertain, train, and reward dogs in multiple different environments. During many instances, dog owners often train dogs to perform tricks or tasks, and offer them rewards for their accuracy or execution of such trick or task. In the study of psychology, "Pavlov's Dog" theory of classical conditioning famously experimented with dogs to test their behaviors using a stimulus and a response associated with the presentation of food. While this psychological theory may translate to the habits of other animals, this theory can also explain the common reward for completing a task process that dog owners often go through and have been customizing over recent time.

The present invention is an edible treat toy for dogs. The present invention can initially act as a form of entertainment for the dog, and is intended to be act as a treat or reward for the dog. The present invention contains a spindle component and a shaped body that comes to a point. The present invention works similarly to a child's toy top, but comes in the form of an edible treat for dogs to consume. Using the spindle component of the present invention, the user may twirl the present invention to entertain or train the dog and to eventually allow the dog to bite and eat the treat.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, edible spinning tops for domesticated animals are presented including: a spindle formed along a central axis; a body formed symmetrically and radially about the central axis and forming an annular cavity about the spindle; a protrusion positioned along the central axis and disposed along the body opposite the spindle; and retaining structures positioned separately along the spindle each forming a raised barrier and a retention valley therebetween, where the spindle protrudes above the body, and where the spindle, the body, and the protrusion include an edible, desiccated, and brittle composition. In some embodiments, an edible ring captured along the retention valley between the retaining structures about the spindle. In some embodiments, the spindle includes a hollowing cavity, the hollowing cavity traverses through the spindle into and ending in the body, the hollowing cavity is concentrically positioned with the spindle, the hollowing cavity extends vertically and continuously to below the annular cavity and terminates before the protrusion, and the hollowing cavity is empty. In some embodiments, the retaining structures are hollow and include a hole for receiving a dose. In some embodiments, the retaining structures include two holes for aerating a dose.

In other embodiments, edible spinning tops for domesticated animals are presented including: a spindle formed along a central axis; a body formed symmetrically and radially about the central axis and forming an annular cavity around the spindle; a protrusion positioned along the central axis and disposed along the body opposite the spindle; retaining structures positioned separately along the spindle, the retaining structures each forming a raised barrier and a retention valley therebetween; and an edible ring captured along the retention valley between the retaining structures about the spindle, where the spindle protrudes above the body, where the spindle includes a hollowing cavity, where the hollowing cavity traverses through the spindle into and ending in the body, where the hollowing cavity is concentrically positioned with the spindle, where the hollowing cavity extends vertically and continuously to below the annular cavity and terminates before the protrusion, where the hollowing cavity is empty, and where the spindle, the body, and the protrusion include an edible, desiccated, and brittle composition.

In other embodiments, edible spinning tops for domesticated animals are presented including: a spindle formed along a central axis; a body formed symmetrically and radially about the central axis and forming an annular cavity around the spindle; a protrusion positioned along the central axis and disposed along the body opposite the spindle; retaining structures positioned separately along the spindle, the retaining structures each forming a raised barrier and a retention valley therebetween, where at least one of the retaining structures are hollow and include at least one hole for receiving a dose; and an edible ring captured along the retention valley between the structures about the spindle, where the spindle protrudes above the body, where the spindle includes a hollowing cavity, where the hollowing cavity traverses through the spindle into and ending in the body, where the hollowing cavity is concentrically positioned with the spindle, where the hollowing cavity extends vertically and continuously to below the annular cavity and terminates before the protrusion, where the hollowing cavity is empty, and where the spindle, the body, and the protrusion include an edible, desiccated, and brittle composition.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 1:
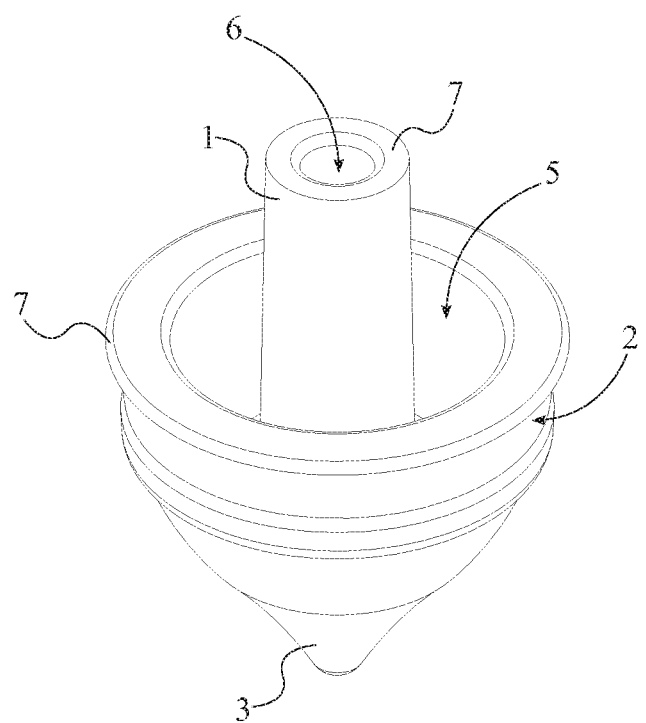
FIG. 1 is a top perspective view of the saucer embodiment for the present invention.
Figure 2:
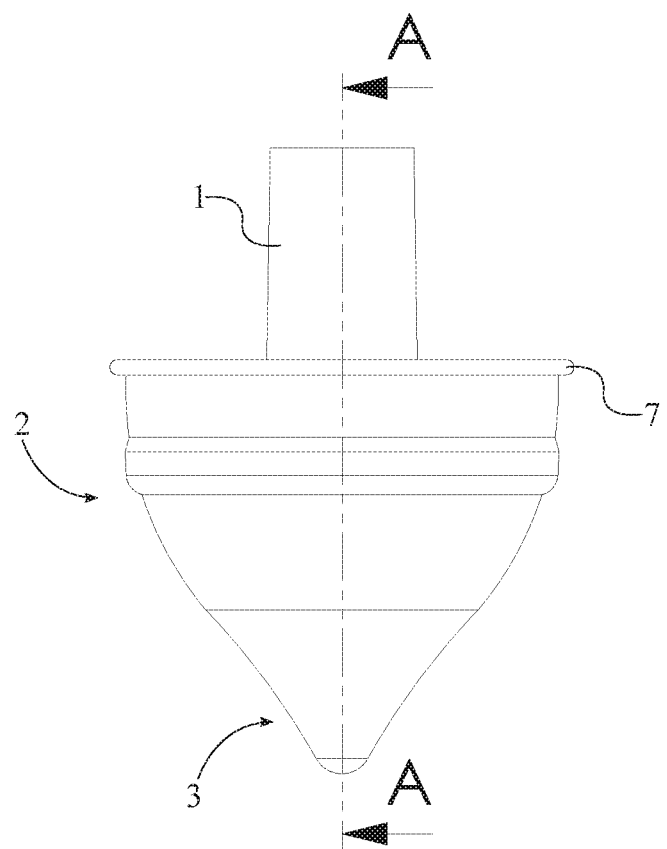
FIG. 2 is a side view of the saucer embodiment for the present invention.
Figure 5:
FIG. 5 is an illustration of the present invention being used with a domesticated animal.

As can be seen in FIGS. 1 and 5, the present invention is an edible spinning top for domesticated animals. The present invention is a kind of edible treat for a dog, a cat, or some other domesticated animal, wherein that edible treat is spun in front of the domesticated animal in order to garner their attention. Consequently, the domesticated animal will be amused by the rapid rotation of the present invention and will proceed to interact and to consume the present invention. The present invention comprises a spindle 1, a body 2, a pointed protrusion 3. The spindle 1 is a shaft protruding from the body 2 that allows a user to grasp and twirl the present invention in order to initiate the rapid rotational motion of the present invention. The body 2 is used to maintain the inertia of the rapid rotational motion of the present invention. The pointed protrusion 3 is a tip extending from the body 2 that allows the present invention to spin upon a surface with minimal friction. The spindle 1, the body 2, and the pointed protrusion 3 are made of an edible, desiccated, and brittle composition. This composition needs to be edible so that no ill health-effects overcome a domesticated animal after consuming the present invention. This composition also needs to be desiccated so that the present invention does not become deformed after spending some time in storage. The prefabricated shape of the present invention is important to maintain because the prefabricated shape allows the present invention to rotate for a longer period of time. Finally, this composition needs to be brittle so that the present invention is rigid enough to be able to rotate about its pointed protrusion 3 yet is crumbly enough to break apart within the domesticated animal's mouth.

Figure 3:
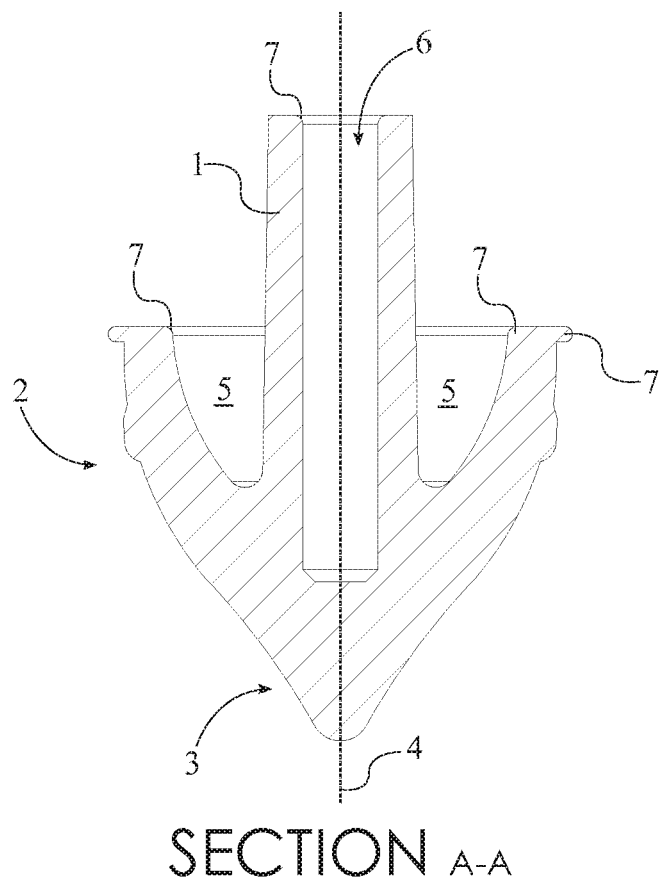
FIG. 3 is a cross-sectional view of the saucer embodiment for the present invention, wherein the cross-sectional view is taken along line A-A in FIG. 2.
Figure 4:
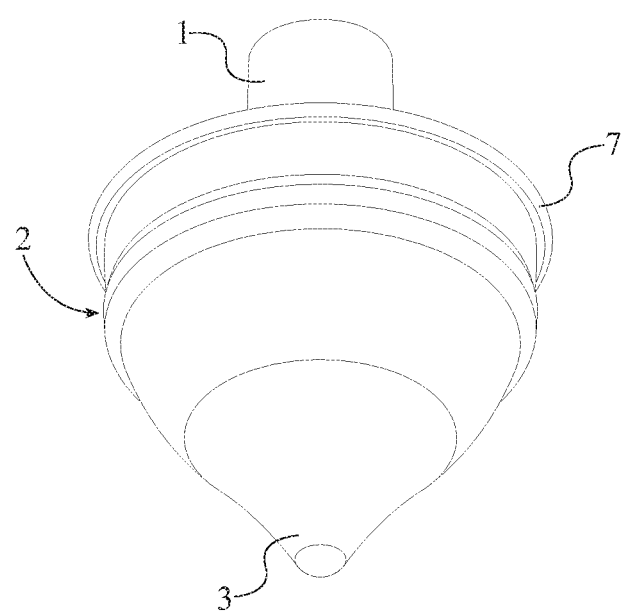
FIG. 4 is a bottom perspective view of the saucer embodiment for the present invention.

The general configuration of the present invention allows its components to spin about a central axis 4, which is shown in FIG. 3. The body 2 is radially symmetric about the central axis 4 so that the present invention can better maintain its angular momentum about the central axis 4. The spindle 1 is connected adjacent to the body 2, which allows the user to generate and transfer the rotational motion from the spindle 1 into the body 2. The pointed protrusion 3 is connected adjacent to the body 2, opposite to the spindle 1, which allows the user to press and spin the pointed protrusion 3 against a contact surface such as the floor or the ground. Both the spindle 1 and the pointed protrusion 3 are positioned along the central axis 4 so that weight of the present invention is evenly distributed about the central axis 4 allowing the present invention to uniformly spin about the central axis 4.

In one embodiment illustrated in FIG. 1 through 4, the present invention is configured with a saucer design, which reduces some of the material needed to manufacture the present invention without minimizing its aesthetic appeal. In addition, this embodiment allows the user to spin the present invention at a faster angular velocity and for a longer period of time. This embodiment comprises an annular cavity 5 and a hollowing cavity 6. The annular cavity 5 removes a section of the body 2 and, thus, traverses into the body 2, opposite to the pointed protrusion 3. The annular cavity 5 is also positioned about the spindle 1 so that the weight removed by the annular cavity 5 is evenly distributed about the central axis 4. The hollowing cavity 6 is a hole located along the central axis 4 and, thus, traverses through the spindle 1 and into the body 2. Similarly, the hollowing cavity 6 is concentrically positioned with the spindle 1 so that the weight removed by the hollowing cavity 6 is evenly distributed about the second axis.

Figure 6:
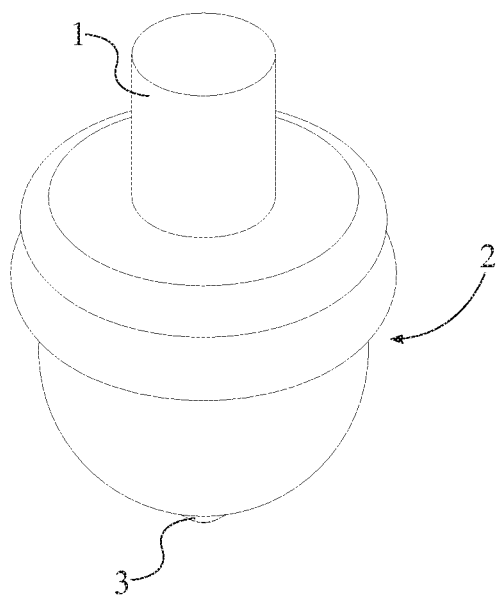
FIG. 6 is a top perspective view of the acorn-shaped embodiment for the present invention.
Figure 7:
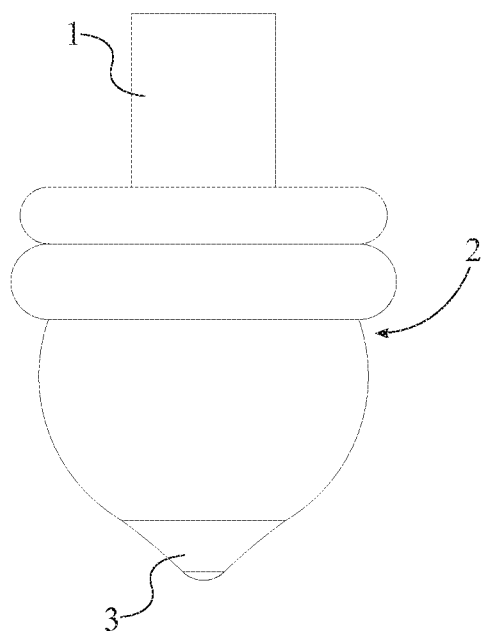
FIG. 7 is a side view of the acorn-shaped embodiment for the present invention.
Figure 8:
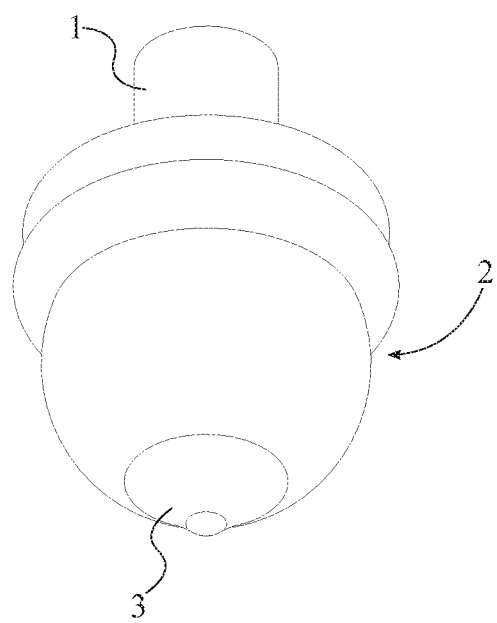
FIG. 8 is a bottom perspective view of the acorn-shaped embodiment for the present invention.
Figure 9:
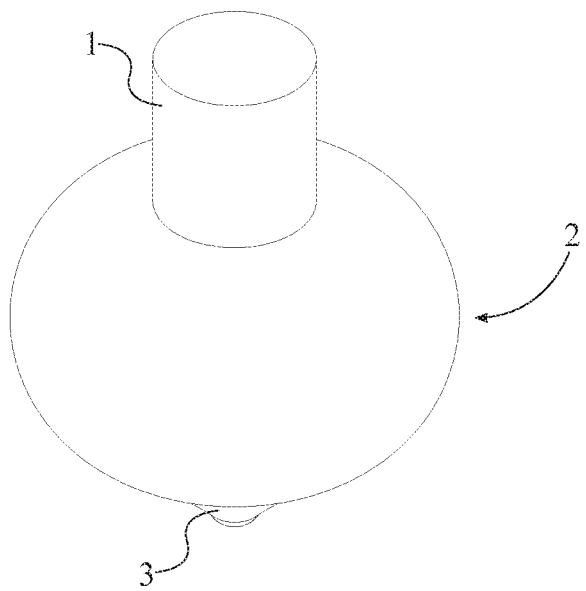
FIG. 9 is a top perspective view of the heart-shaped embodiment for the present invention.
Figure 10:
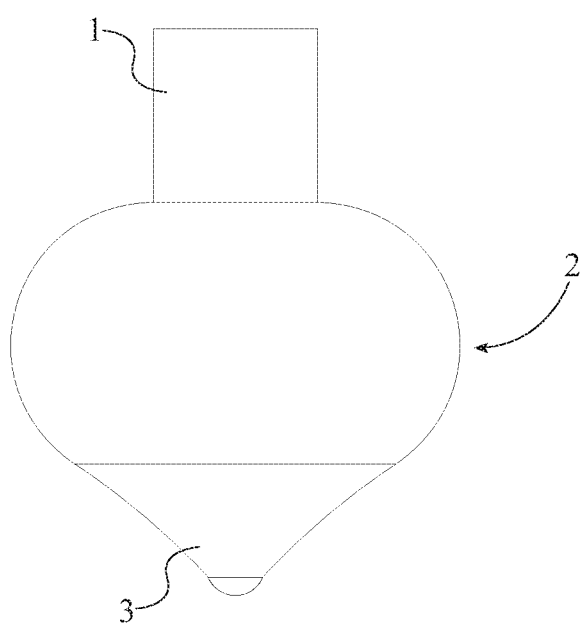
FIG. 10 is a side view of the heart-shaped embodiment for the present invention.
Figure 11:
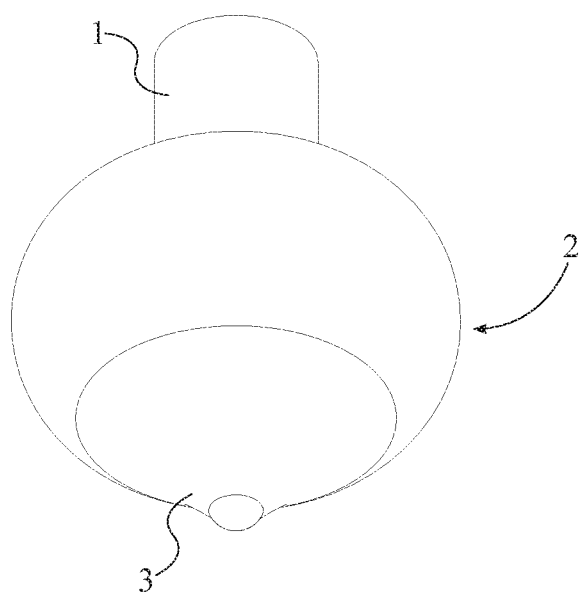
FIG. 11 is a bottom perspective view of the heart-shaped embodiment for the present invention.
Figure 12:
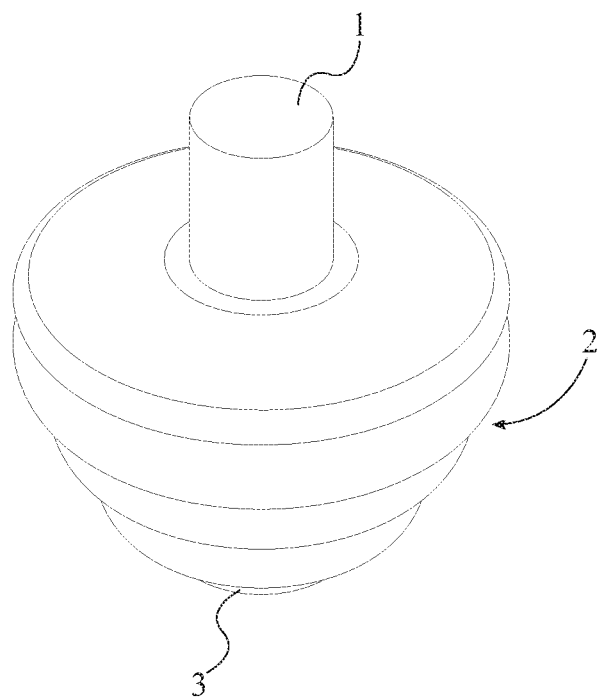
FIG. 12 is a top perspective view of the spiral-shaped embodiment for the present invention.
Figure 13:
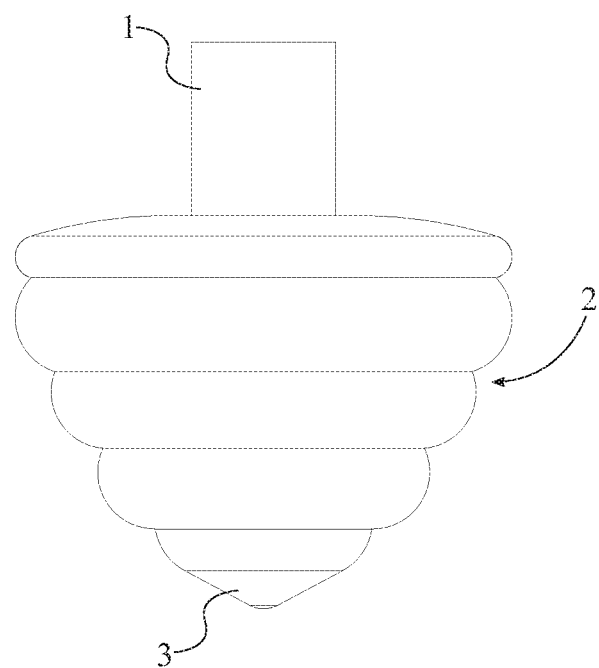
FIG. 13 is a side view of the spiral-shaped embodiment for the present invention.
Figure 14:
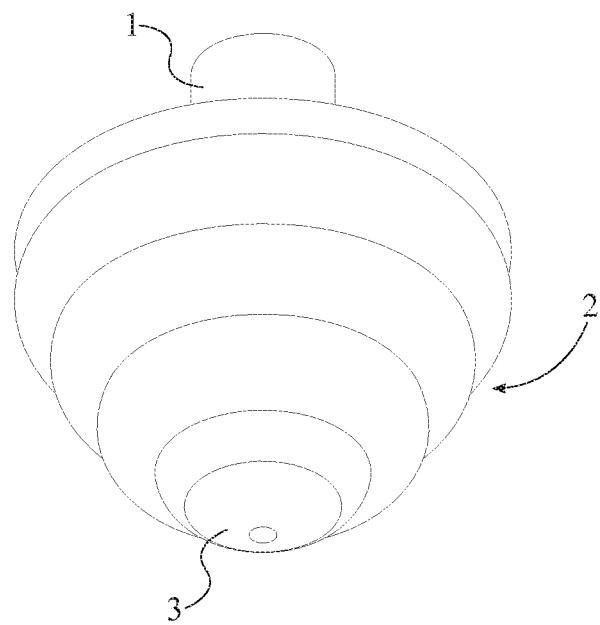
FIG. 14 is a bottom perspective view of the spiral-shaped embodiment for the present invention.

Moreover, the present invention can be made into different designs, shapes, and sizes. In another embodiment, the present invention is configured with an acorn design, which is illustrated in FIGS. 6, 7, and 8. In yet another embodiment, the present invention is configured with a heart design, which is illustrated in FIGS. 9, 10, and 11. In yet another embodiment, the present invention is configured with a spiral design, which is illustrated in FIGS. 12, 13, and 14. Such different designs may appeal to different groups of dogs or dog owners based on their preference. The present invention may also be produced in different sizes to accommodate different sizes of dogs.

As can be seen in FIGS. 1 and 3, the present invention implements a number of features that allow a domesticated animal to safely consume and ingest the present invention. One such feature is that the pointed protrusion 3 is configured as a blunted tip, which prevents the present invention from lacerating the mouth of the domesticated animal with the pointed protrusion 3. Another such feature is that the edges of the body 2 and the spindle 1 are not sharp but rounded, which again prevents the present invention from lacerating the mouth of the domesticated animal.

The edible, desiccated, and brittle composition for the present invention can be made using a variety of standard food baking ingredients through a number of different baking methods. In the preferred embodiment of the present invention, the edible, desiccated, and brittle composition includes, but is not limited to, the following ingredients: flour (preferably organic); water; egg; cinnamon and molasses (either depending on the flavor); peanut butter and honey; beef broth and cheese; chicken broth and parsley; and a combination thereof.

A method of using the present invention for a domesticated animal is described in the following steps. First, the user identifies the current location of the domesticated animal, which allows the user to spin the present invention in the general vicinity of the domesticated animal. Next, the user grasps and twists the spindle 1 into a cocked position for the present invention so that the user can readily let go and spin the present invention. Then, the user rapidly rotates the present invention by releasing the spindle 1 from the cocked position, which should garner the attention of the domesticated animal. The present invention can be directed in two ways while being released by the user: one way is to direct the edible spinning top towards the current location of the domesticated animal; and the other way is to direct the edible spinning top away from the current location of the domesticated animal. Finally, the domesticated animal is alerted to interact and consume the present invention as the present invention is rotating about its central axis 4. One manner in which a domesticated animal may interact with the present invention is that the domesticated animal will either nudge or swat at the present invention as the present invention is spinning. Consequently, the present invention will move away from the domesticated animal so that the domesticated animal can chase down the present invention in order to consume it.

Although the invention has been explained in relation to its preferred embodiment, it is to be understood that many other possible modifications and variations can be made without departing from the spirit and scope of the invention as hereinafter claimed.

Alternate Embodiments

Figure 16:
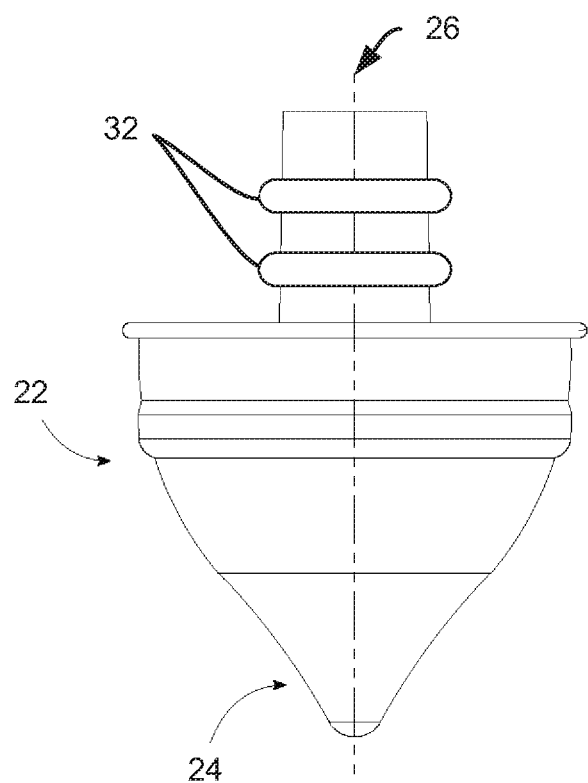
FIG. 16 is a side view of an edible spinning top embodiment in accordance with embodiments of the present invention.

As noted above, the general configuration of the present invention allows its components to spin about a central axis 26, which is shown in FIG. 16. The body 22 is radially symmetric about the central axis 26 so that the present invention can better maintain its angular momentum about the central axis 26. The spindle 20 is connected adjacent to the body 22, which allows the user to generate and transfer the rotational motion from the spindle 20 into the body 22. The pointed protrusion 24 is connected adjacent to the body 22, opposite to the spindle 1, which allows the user to press and spin the pointed protrusion 24 against a contact surface such as the floor or the ground. Both the spindle 20 and the pointed protrusion 24 are positioned along the central axis 26 so that weight of the present invention is evenly distributed about the central axis 26 allowing the present invention to uniformly spin about the central axis 26.

Figure 15:
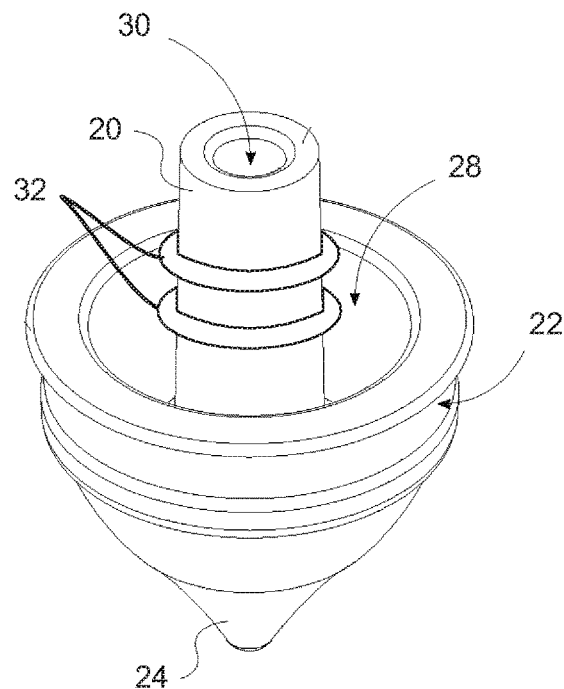
FIG. 15 is a top perspective view of an edible spinning top embodiment with edible ring in accordance with embodiments of the present invention.
Figure 15:
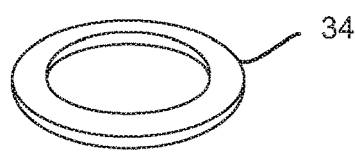
Figure 15:
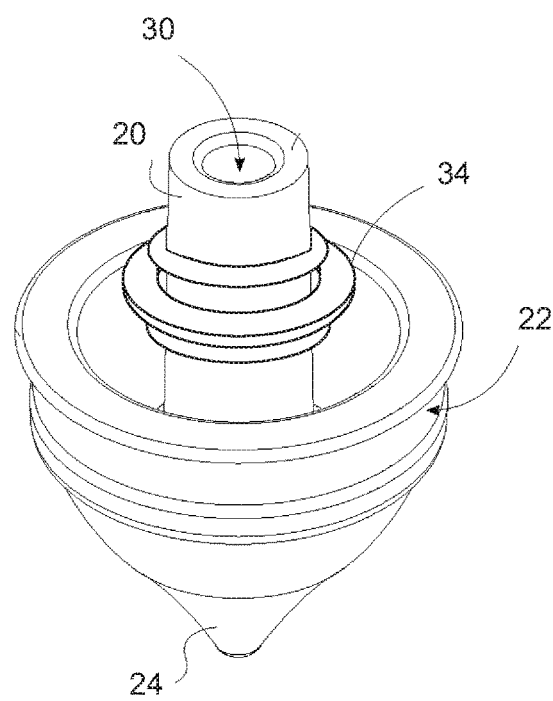
Figure 17:
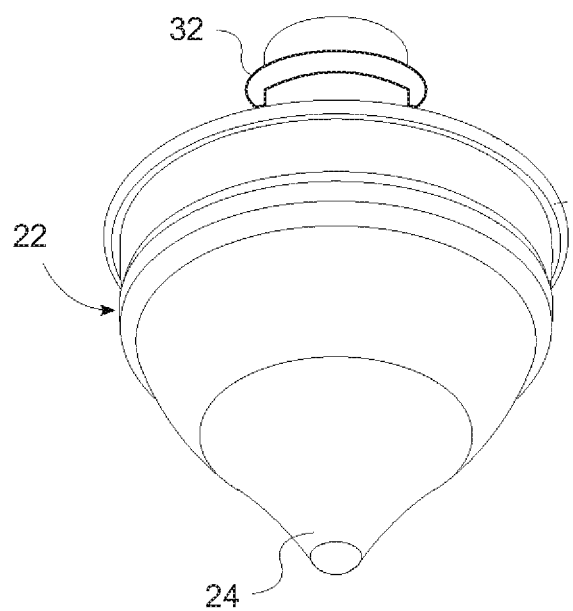
FIG. 17 is a bottom perspective view of an edible spinning top embodiment in accordance with embodiments of the present invention.

In an embodiment illustrated in FIGS. 15, 16, and 17, which respectively present a top, a side, and a bottom perspective view of an edible spinning top embodiment with edible ring in accordance with embodiments of the present invention. The saucer design shown reduces some of the material needed to manufacture the present invention without minimizing its aesthetic appeal. In addition, this embodiment allows the user to spin the present invention at a faster angular velocity and for a longer period of time. This embodiment comprises an annular cavity 28 and a hollowing cavity 30. The annular cavity 28 removes a section of the body 22 and, thus, traverses into the body 22, opposite to the pointed protrusion 24. The annular cavity 28 is also positioned about the spindle 20 so that the weight removed by the annular cavity 28 is evenly distributed about the central axis 26. The hollowing cavity 30 is a hole located along the central axis 26 and, thus, traverses through the spindle 20 and into the body 22. Similarly, the hollowing cavity 30 is concentrically positioned with the spindle 20 so that the weight removed by the hollowing cavity 30 is evenly distributed about the central axis. Further illustrated are two retaining rings 32 that are positioned separately along spindle 20 each forming a raised barrier and a retention valley therebetween. In embodiments, edible ring 34 may be captured along the retention valley between the two retaining structures 32 about spindle 20. Although two retaining structures and one edible ring are illustrated, one skilled in the art will recognize that additional retaining structures and edible rings may be utilized without departing from embodiments herein. For example, three retaining structures may capture two or more edible rings in an embodiment.

In embodiments, edible spinning tops and edible rings may include ingredients for a specific type of domestic animal. For example, for felines, edible spinning tops and edible rings include ingredients such as: cat nip, wheat gluten, water, corn flour, vegetable glycerin, gelatin, and citric acid. Likewise, for canines, edible spinning tops and edible rings include ingredients such as: potato flour, pea starch, gelatin, water, pea powder, natural flavoring, sunflower seed oil, citric acid, and zinc propionate. In some embodiments, it may be desirable to make edible rings in a formulation different from the edible spinning tops to, for example, provide a supplement for the domesticated animal. In those embodiments, edible rings include a formulation such as: a vitamin formulation, a medical formulation, a medicinal formulation, a supplement formulation, a mineral formulation, and a placebo formulation.

Figure 18:
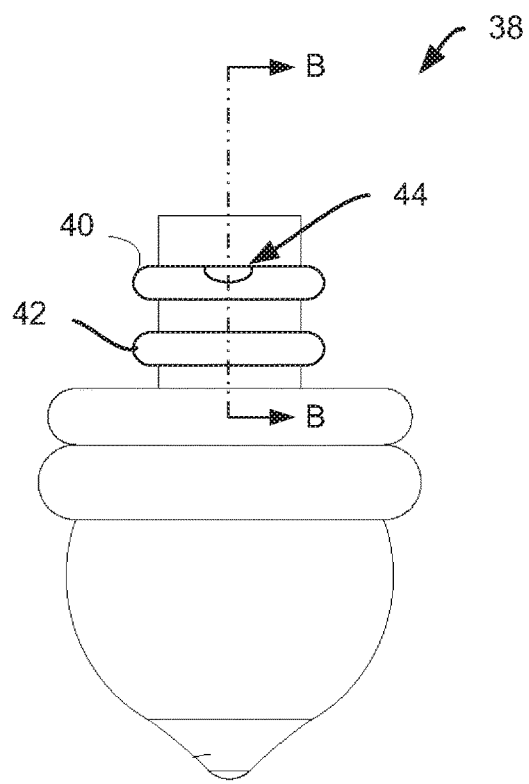
FIG. 18 is a side view of an edible spinning top embodiment with hollow retaining structure in accordance with embodiments of the present invention.
Figure 18:
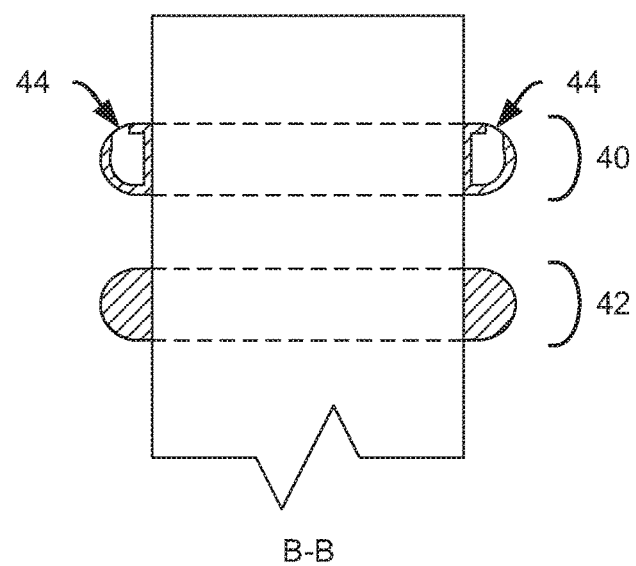

FIG. 18 is a side view of an edible spinning top embodiment with hollow retaining structure in accordance with embodiments of the present invention. Further illustrated is cross-section B-B for clarity in understanding embodiments disclosed herein. As illustrated, edible spinning top 38 includes two retaining structures namely hollowed retaining structure 40 and solid retaining structure 42. A hollowed retaining structure may include one or more holes 44 for receiving suitable formulation doses for a domestic animal. It may be desirable, for example, to provide a supplement for the domesticated animal. As such, doses include a formulation such as: a vitamin formulation, a medical formulation, a medicinal formulation, a supplement formulation, a mineral formulation, a scented formulation, and a placebo formulation. Notably, in the scented formulation, it may be desirable to provide an "attractive" scent to formulations that are otherwise undesirable to the animal. In these examples, two or more holes may be formed along the hollow retaining structure in order to aerate the scented formulation.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. An edible spinning top for domesticated animals comprising:
   a spindle formed along a central axis;
   a body formed symmetrically and radially about the central axis and forming an annular cavity about the spindle;
   a protrusion positioned along the central axis and disposed along the body opposite the spindle; and
   at least two retaining structures positioned separately along the spindle, the at least two retaining structures each forming a raised barrier and a retention valley therebetween, wherein
      at least one of the at least two retaining structures is hollow and comprises a hole for receiving a dose, wherein
      the spindle protrudes above the body, and wherein
      the spindle, the body, and the protrusion comprise an edible, desiccated, and brittle composition.

2. The edible spinning top of claim 1, further comprising:
   an edible ring captured along the retention valley between the at least two retaining structures about the spindle.

3. The edible spinning top of claim 2, wherein the edible ring comprises ingredients selected from the group consisting of: cat nip, wheat gluten, water, corn flour, vegetable glycerin, gelatin, citric acid, and a combination thereof.

4. The edible spinning top of claim 3, wherein the edible ring further comprises a formulation selected from the group consisting of: a vitamin formulation, a medical formulation, a medicinal formulation, a supplement formulation, a mineral formulation, and a placebo formulation.

5. The edible spinning top of claim 2, wherein the edible ring comprises ingredients selected from the group consisting of: potato flour, pea starch, gelatin, water, pea powder, natural flavoring, sunflower seed oil, citric acid, zinc propionate, and a combination thereof.

6. The edible spinning top of claim 1, wherein
   the spindle includes a hollowing cavity, wherein
   the hollowing cavity traverses through the spindle into and ending in the body, wherein
   the hollowing cavity is concentrically positioned with the spindle, wherein
   the hollowing cavity extends vertically and continuously to below the annular cavity and terminates before the protrusion, and wherein
   the hollowing cavity is empty.

7. The edible spinning top of claim 1, wherein
   the one of the at least two retaining structures comprise at least two holes for aerating a dose.

8. The edible spinning top of claim 7, wherein the dose is a formulation selected from the group consisting of: a vitamin formulation, a medical formulation, a medicinal formulation, a supplement formulation, a mineral formulation, a scented formulation, and a placebo formulation.

9. The edible spinning top of claim 1, wherein said protrusion is a blunted tip.

10. The edible spinning top of claim 1, wherein said body and said spindle having rounded edges.

11. The edible spinning top of claim 1 comprises ingredients selected from the group consisting of: cat nip, wheat gluten, water, corn flour, vegetable glycerin, gelatin, citric acid, and a combination thereof.

12. The edible spinning top of claim 1 comprises ingredients selected from the group consisting of: potato flour, pea starch, water, gelatin, pea powder, natural flavoring, sunflower seed oil, citric acid, zinc propionate, and a combination thereof.

13. An edible spinning top for domesticated animals comprising:
   a spindle formed along a central axis;
   a body formed symmetrically and radially about the central axis and forming an annular cavity around the spindle;
   a protrusion positioned along the central axis and disposed along the body opposite the spindle;
   at least two retaining structures positioned separately along the spindle, the at least two retaining structures each forming a raised barrier and a retention valley therebetween, wherein one of the at least two retaining structures comprises at least two holes for aerating a dose; and
   an edible ring captured along the retention valley between the at least two retaining structures about the spindle, wherein
      the spindle protrudes above the body, wherein
      the spindle includes a hollowing cavity, wherein
      the hollowing cavity traverses through the spindle into and ending in the body, wherein
      the hollowing cavity is concentrically positioned with the spindle, wherein
      the hollowing cavity extends vertically and continuously to below the annular cavity and terminates before the protrusion, wherein
      the hollowing cavity is empty, and wherein
      the spindle, the body, and the protrusion comprise an edible, desiccated, and brittle composition.

14. An edible spinning top for domesticated animals comprising:
   a spindle formed along a central axis;
   a body formed symmetrically and radially about the central axis and forming an annular cavity around the spindle;
   a protrusion positioned along the central axis and disposed along the body opposite the spindle;
   at least two retaining structures positioned separately along the spindle, the at least two retaining structures each forming a raised barrier and a retention valley therebetween, wherein one of the at least two retaining structures is hollow and comprises a hole for receiving a dose; and an edible ring captured along the retention valley between the at least two retaining structures about the spindle, wherein the spindle protrudes above the body, wherein the spindle includes a hollowing cavity, wherein the hollowing cavity traverses through the spindle into and ending in the body, wherein the hollowing cavity is concentrically positioned with the spindle, wherein the hollowing cavity extends vertically and continuously to below the annular cavity and terminates before the protrusion, wherein the hollowing cavity is empty, and wherein the spindle, the body, and the protrusion comprise an edible, desiccated, and brittle composition.

* * * * *